United States Patent

[11] 3,552,469

| [72] | Inventor | Lee M. Corless<br>610 Roslyn Road, Grosse Pointe Woods, Mich. 48236 |
| --- | --- | --- |
| [21] | Appl. No. | 800,679 |
| [22] | Filed | Feb. 19, 1969 |
| [45] | Patented | Jan. 5, 1971 |

[54] TIRE BEAD SEATER
27 Claims, 9 Drawing Figs.

| [52] | U.S. Cl. | 157/1.1 |
| --- | --- | --- |
| [51] | Int. Cl. | B60c 25/06 |
| [50] | Field of Search | 157/1, 1.1, 1.17, 1.24 |

[56] References Cited
UNITED STATES PATENTS

| 2,874,760 | 2/1959 | Bishop | 157/1.1 |
| --- | --- | --- | --- |
| 2,900,015 | 8/1959 | Harrison | 157/1.1 |
| 2,913,035 | 11/1959 | Lapin et al. | 157/1.1X |
| 3,081,816 | 3/1963 | Branick | 157/1.1 |
| 3,461,938 | 8/1969 | Mueller | 157/1.1 |

*Primary Examiner*—Granville Y. Custer, Jr.
*Attorney*—Whittemore, Hulbert & Belknap ABSTRACT: A method and apparatus for inflating tubeless tires on a vehicle wheel is provided. The apparatus comprises an annular tube of larger diameter than the wheel to be received over the wheel adjacent to the rim of the wheel. Orifice means are provided on the periphery of the tube for injecting air under pressure through the space between the wheel rim and the bead of an uninflated tubeless tire mounted on the wheel. Inlet means are provided on the tube for supplying air under pressure to the interior of the tube.

The method comprises first mounting a noninflated tubeless tire on a vehicle wheel. The annular tube is then placed on the wheel and air under pressure is injected into the tire from the annular tube through the space between the wheel rim and the adjacent tire bead to partially inflate the tire and cause the tire sidewall and bead to almost make sealing contact with the wheel rim. The tire is then completely inflated by injecting air under pressure through the conventional tire valve.

PATENTED JAN 5 1971
3,552,469
SHEET 1 OF 2
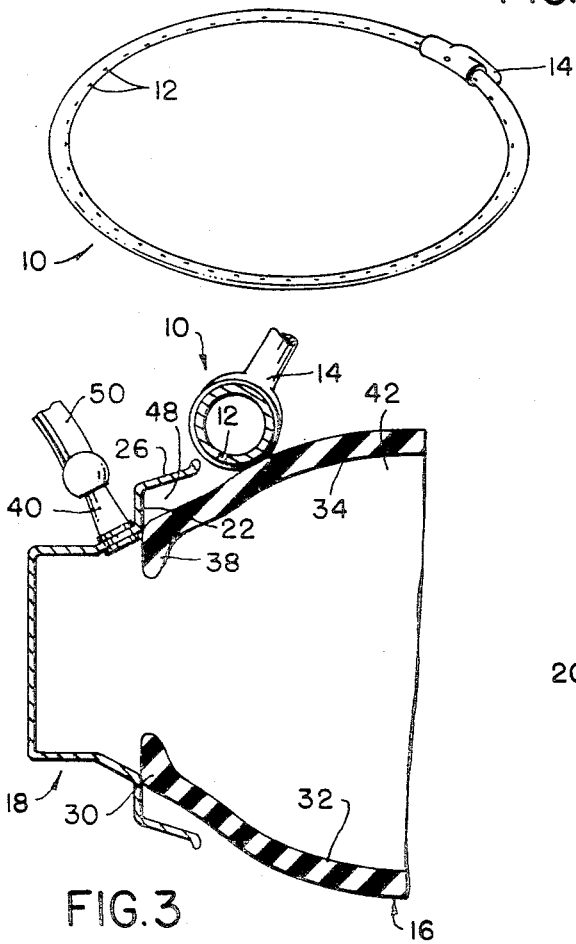
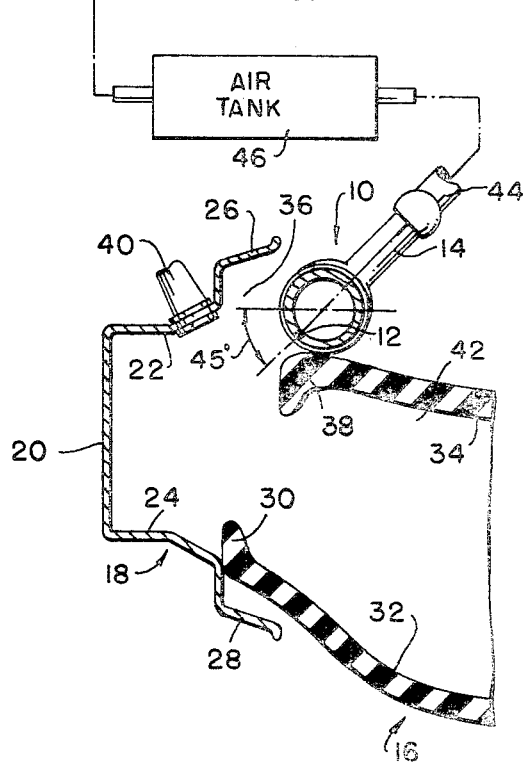
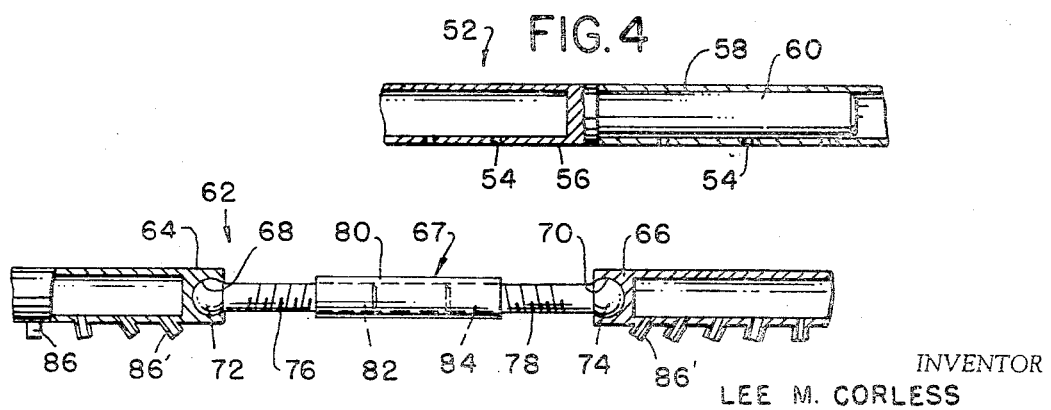
INVENTOR
LEE M. CORLESS
BY Whittemore, Hulbert
& Belknap
ATTORNEYS

INVENTOR
LEE M. CORLESS

BY *Whittemore Hulbert*
*& Belknap*

ATTORNEYS

TIRE BEAD SEATER

BACKGROUND OF THE INVENTION

Inflation of tubeless tires on vehicle wheels has proved to be a problem. In the manufacture and shipping of tubeless tires, the tire sidewalls cave inwardly. As a consequence, when the tire is mounted on a wheel, the sidewalls do not form a sealing engagement with the rim of the wheel. The practice in the past for inflation of tubeless tires has been to engage the tread of the tire with an annular constricting device such as a strap of metal. The strap of metal is then tightened thus forcing the sidewalls outwardly into sealing engagement with the wheel rims.

This technique has proved to be unsatisfactory for the inflation of certain types of tubeless tires. Some tubeless tires have only a few plies forming the sidewalls which lack body and will not pop outwardly into engagement with the wheel rims when the band is tightened around the tread. Difficulty has also been encountered in the inflation of large truck tires for off-the-road equipment as well as for tires of the radial ply type.

One type of apparatus for inflating tubeless tires is disclosed in U.S. Pat. No. 3,280,980, issued Oct. 25, 1966. This patent teaches the use of a compressible annular band of resilient sealing material carried by a rigid band on the inner surface thereof. The sealing member has a portion which sealingly contacts the sidewall of a tire and also a portion which forms a sealing, sliding contact with the rim of the wheel.

This apparatus has proven satisfactory for most applications. However, there are certain types of tires and wheels which are difficult to inflate by use of this equipment. The problem is that as the tire is inflated, the sealing ring is forced upwardly until it eventually loses sealing contact with the rim of the wheel. At this point, in some cases, the bead of the tire has not yet reached sealing contact with the rim of the wheel. After sealing contact is lost with the sealing ring, air may escape and prevent complete inflation of the tire. Additionally, this mechanical apparatus is relatively cumbersome and expensive when utilized for inflation of large tires such as those for off-the-road equipment and the like.

In accordance with the present invention, apparatus for inflating tubeless tires is provided which utilizes only a simple annular tubular member which injects air into the tire without the use of any working parts which must slide or otherwise fit exactly on the tire or wheel. There is thus no wear of parts and the problem of accurate dimensions is considerably reduced. In fact, the apparatus may be used to inflate tires of different sizes. Additionally, the apparatus is inexpensive to construct and is easy to use. The apparatus may be provided in different sizes to handle, for example, vehicle tires, truck tires and off-the-road equipment tires. In the case of large tires, the apparatus is not cumbersome and expensive.

SUMMARY OF THE INVENTION

Apparatus for inflating tubeless tires on a vehicle wheel is provided. The apparatus comprises an annular tube of larger diameter than the wheel and is received over the wheel adjacent to the rim thereof. Orifice means are provided around the periphery of the tube for injecting air under pressure through the space between the wheel rim and the bead of an uninflated tubeless tire mounted on the wheel. Inlet means are provided on the tube for supplying air under pressure to the interior of the tube.

The method of inflating a tubeless tire on a vehicle wheel comprises a step of first mounting a noninflated tubeless tire on a vehicle wheel. The annular tube is then placed on the tire. Air is then injected from the annular tube into the tire through the space between the wheel rim and the tire bead to cause the bead to almost make sealing contact with the wheel rim. The tire is then completely inflated by injecting air under pressure through the conventional tire valve.

In the drawings:

FIG. 1 is a view in perspective of one embodiment of the tire bead seater in accordance with the present invention;

FIG. 2 is a partial view of the right-hand portion of a vehicle tire and wheel with the apparatus of FIG. 1 shown assembled thereon for inflation thereof;

FIG. 3 is a view similar to FIG. 2 illustrating the tire when it is almost completely inflated;

FIG. 4 is a sectional view of the telescoping connection of an expandable air inflating ring;

FIG. 5 is a view partially in section of the turn buckle connection of a modified version of the expandable air inflating ring;

Figure 6:
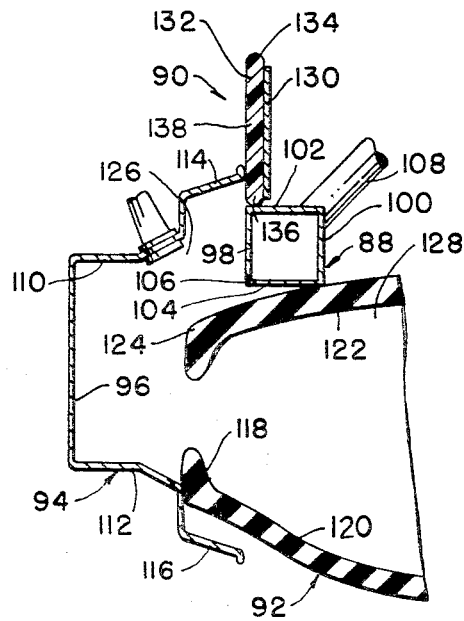
FIG. 6 is a partial view in section of the right-hand portion of a vehicle tire and wheel with another embodiment of the tire bead seater assembled thereon for inflation thereof.

Referring to FIG. 1, the tire bead seater 10 comprises an annular tubular member having a diameter somewhat larger than a vehicle wheel and the inner diameter of a vehicle tire. A single bead seater 10 may service tires having some variation in inner diameter as, for example, from a 13- to a 15-inch diameter tire as is common on automobiles. Bead seater 10 having larger diameters may be provided for inflation of larger tires such as truck tires and tires for off-the-road equipment. The bead seater 10 may be fabricated from various materials such as metal, plastic or rubber. The bead seater 10 may be a cast element or it may be formed by bending a length of tubing into a circle and sealing the free ends to each other.

A plurality of orifices 12 are provided in spaced apart relationship around the interior periphery of the bead seater 10. The orifices may be provided at, for example, 2-inch intervals although other spacings are permissible. Instead of a circular opening as shown, the orifices may assume other geometric configuration such as elongated slots or the like. Further, a continuous or interrupted slit may be used to form an orifice means.

As will be noted in FIG. 2, the orifices 12 are provided so that the stream of air ejected therethrough is at an angle of 45° to the horizontal plane. However, the orifices may be aimed to provide other angles to suit the inflation needs of various tires.

An injection nozzle 14 is provided for injecting air from a source of air under pressure into the bead seater so that air will be expelled therefrom to the orifices 12 as individual air jets. The nozzle 14 is preferable a ½-inch nozzle for the reception of a ½-inch air hose for supplying a sufficient volume of air for inflating a tire. The nozzle 14 may be larger or smaller depending upon the type of tire which is to be inflated.

In accordance with the method of the invention, the tire bead seater 10 is utilized as illustrated in FIGS. 2 and 3. A tubeless tire 16 is first mounted on a wheel 18 as shown in FIG. 2. This is accomplished by means of any conventional tire mounting apparatus. It will be noted that the wheel 18 comprises a central cylindrical section 20 having angularly outwardly extending annular flange portions 22, 24 which terminate in annular rims 26, 28.

It will be noted that the lower bead 30 of the tire sidewall 32 is in contact with the wheel 18 at the juncture of the flange 24 and rim 28. The upper sidewall 34, as is the usual condition when attempting to inflate tubeless tires, is collapsed downwardly with the bead 38 out of engagement with the upper wheel flange 22 and rim 26. There is therefore a relatively wide space 36 between the bead 38 and rim 26. It is consequently impossible to inflate the tire by means of the usual tire valve 40 because air which is injected through the valve 40 will escape to the atmosphere via the space 36 without inflating the tire.

After the tire 16 has been mounted on the wheel 18, the tire bead seater 10 is placed over the wheel 18 and onto the upper sidewall 34 with the orifices 12 aimed to inject a jet of air through the space 36 and into the interior tire chamber 42. An air line 44 is attached to the nozzle 14 and air under pressure is injected through the nozzle 14.

The airline 44 leads to an air tank 46 which provides a relatively large volume of air under the desired pressure. Thus, a surge of air under pressure is available to cause inflation of the tire. The air tank 46 may be filled by the usual air compressor available in most automotive or tire mounting service stations. Frequently, the capacity of the usual air compressor available at these stations is not sufficient to inflate the tire when the compressor is used directly without a reserve air tank such as the tank 46. Additionally, the air hose leading from the usual compressor may be a quarter inch or ⅜-inch hose which may not be sufficient to properly inflate the tire by means of the tire bead seater 10.

As air under pressure is injected into the chamber 42 via the orifices 12, the sidewall 34 begins to rise as a result of the increased air pressure within the chamber 42. While some air may escape to the atmosphere via the space 36, there is sufficient air under pressure forced into the chamber 42 to cause inflation of the tire. A wall or curtain of air under pressure exists across the space 36 preventing or minimizing passage of air under pressure from the tire chamber 42. Thus, the sidewall 34 will rise until a point of equilibrium, as shown in FIG. 3, is reached, wherein the bead 38 contacts the wheel periphery but does not necessarily have sealing engagement therewith. At this time, the space 48 between the bead 38 and rim 26 is relatively small. Complete inflation is not normally obtained by use of the tire bead seater 10. At this time the usual air hose 50 is applied to the usual tire valve 40 and air under pressure is injected into the tire chamber 42 via the valve 40. This causes complete inflation of the tire with the bead 38 sealingly engaging the wheel 18 at the juncture of the rim 26 and flange 22.

At the time when air under pressure is injected via the valve 40, injection of air under pressure through the bead seater 10 may be discontinued. A three way valve may be provided for this purpose, that is to simultaneously begin injection of air through the valve 40 and discontinuing injection of air through the nozzle 14. Alternately, separate hoses may be used and each hose actuated to start and stop.

FIG. 4 illustrates another embodiment of the invention. The tire bead seater 52 illustrated in FIG. 4 has an annular configuration as described in connection with the bead seater 10 of FIG. 1 and is provided with a plurality of orifices 54 around the interior periphery thereof as in the case with the FIG. 1 embodiment. However, the free ends 56, 58 of the bead seater 52 are connected telescopically so that the diameter of the bead seater 52 may be varied to suit different tire sizes.

As will be noted, one end 56 has an outwardly projecting elongated cylindrical plug 60 which is slidingly received within the end 58. The plug 60 results in an airtight seal so that air will not escape from the junction of the ends 56, 58. As will be appreciated, the interior diameter of the bead seater 52 may be enlarged by pulling the ends 56, 58 away from each other and may be reduced by forcing the ends 56, 58 closer together.

The plug 60 may be provided as an open-ended tubular member with a slit along one sidewall in alignment with the orifices 54 so that there will always be a flow of air from the area where the plug is located. Thus, when the plug is inserted entirely within the end 58, air will pass through the slit in the plug and through the orifices directly in alignment therewith. As the plug is withdrawn, air will pass through the slit in the plug directly into the tire which is being inflated.

FIG. 5 illustrates another embodiment of a variable size tire bead seater 62. The tire bead seater 62 has an annular form similar to the tire bead seater 10 of FIG. 1. However, the ring is discontinuous and the free ends 64, 66 are plugged so that air cannot pass from the ends. A turnbuckle 67 connects the free ends 64, 66. A socket 68, 70 is provided in each of the ends 64, 66. The sockets 68, 70 receive balls 72, 74 provided on the ends of threaded bolts 76, 78. It will be noted that the bolts 76, 78 have reverse threads as is the usual case with a turnbuckle. An internally threaded sleeve 80 threadingly receives the ends 82, 84 of each of the bolts 76, 78. Turning of the sleeve 80 in one direction will cause the bolts 76, 78 to be threaded into the sleeve with a consequent reduction in the overall diameter of the tire bead seater 62. Conversely, turning of the sleeve 80 in the opposite direction will cause the bolts 76, 78 to be threaded out of the sleeve and will result in enlarging the diameter of the tire bead seater 62. The tire bead seater 62 may thus be varied in diameter to suit different diameter tires which are to be inflated.

A plurality of spaced apart nozzles 86 are provided on the interior periphery of the tire bead seater 62 rather than the openings in the tube as described in the previous embodiments. It will be noted that the nozzles 86 close to the ends 64, 66 of the tire bead seater are angled inwardly in a fanlike manner to provide a curtain of air in the space occupied by the turnbuckle. In this manner, there is no gap between the ends of the tire bead seater which is not filled with air under pressure when a tire is being inflated. Such a gap would permit some air to escape to the atmosphere thus decreasing the efficiency of the tire bead seater.

FIG. 6 illustrates a tire bead seater 88 which has a square cross-sectional configuration. The tire bead seater 88 is illustratively used in conjunction with an auxiliary tire bead seater 90 of the type described in U.S. Pat. No. 3,280,880, D. E. Ericson et al. issued Oct. 25, 1966. The bead seater 90 may be used with other of the embodiments of the present tire bead seater. However, it is particularly adapted for use in connection with the bead seater 88.

The tire bead seater 88 comprises an annular tubular member having a diameter somewhat larger than the outer diameter of a vehicle wheel and the inner diameter of a vehicle tire. As previously mentioned, the bead seater 88 is square in cross section having opposed sidewalls 98, 100, top wall 102 and bottom wall 104. A plurality of orifices 106 are provided in spaced apart relationship around the interior periphery of the bead seater 88 at the junction of the side wall 98 and bottom wall 104. An injection nozzle 108 is provided for injecting air from a source of air under pressure.

As previously described in connection with FIGS. 2 and 3, the tire bead seater 88 is utilized to inflate a tubeless tire 92 which is first mounted on a wheel 94. The wheel 94 comprises a central cylindrical section 96 having angularly outwardly extending annular flange portions 110, 112 which terminate in annular rims 114, 116.

The lower bead 118 of the tire sidewall 120 is in contact with the wheel 94 at the juncture of the flange 112 and rim 116. The upper sidewall 122 is collapsed downwardly with the bead 124 out of engagement with the upper wheel flange 110 and rim 114, leaving a space 126 between the bead 124 and rim 114.

After the tire 92 has been mounted on the wheel 94, the tire bead seater 88 is placed over the wheel 94 and onto the upper sidewall 122 with the orifices 106 aimed to inject a jet of air through the space 126 and into the interior tire chamber 128.

The auxiliary tire bead seater 90 is then mounted on the wheel 94 and rests on the top wall 102 of the bead seater 88. The auxiliary bead seater 90 comprises an annular, substantially rigid band 130 which is of greater diameter than the wheel 94. A relatively thick uninterrupted compressible layer 132 of plastic, rubber or the like is provided within and secured to the inner surface of the annular band 130. The compressible layer extends beyond the edges of the band 130 and terminates in tip portions 134, 136. The lower tip portion 136 sealingly engages the top wall 102 of the bead seater 88. The inner surface 138 sealingly engages the rim 114 to thereby seal the space between the bead seater 88 and the rim 114. As the tire is inflated, the sidewall 122 rises carrying with it the auxiliary bead seater 90. The bead seater 90 maintains an airtight seal between the wheel and upper sidewall 122 until it is raised off the wheel by upward movement of the sidewall 122. The use of the auxiliary bead seater 90 reduces the amount of air which must be injected into the tire 92 in order to inflate the tire. This permits inflation of tires which might otherwise be difficult to inflate, such as heavy off-the-road or truck tires, and also reduces the capacity of the air compressor which must be used in connection with the inflation operation. Further, the auxiliary bead seater 90 improves the efficiency of the inflation operation by virtue of the utilization of less compressed air.

After the various components have been assembled as illustrated in FIG. 6, an air line is applied to the nozzle 108 and air under pressure is injected therethrough. The air passes as jets through the orifices 106 through the space 126 into the chamber 128 to cause inflation of the tire. As air under pressure is injected into the chamber 128, the sidewall 122 begins to rise as a result of the increased air pressure within the chamber 128. The auxiliary bead seater 90 maintains the air seal between the rim 114 and sidewall 122 so that virtually no air is lost to the atmosphere other than air which may be lost at the bottom of the tire between the sidewall 120 and rim 116, it being appreciated that there is not a good airtight seal at this point until the tire is entirely inflated. When the sidewall 122 has risen sufficiently to raise the auxiliary bead seater 90 off the rim 114, the sidewall 98 of the bead seater 88 will be close to the rim 114. Although there will not be a good airtight seal at this juncture, the space through which air may escape is considerably reduced. This is one of the advantages of the square configuration of the bead seater 88. Another advantage of this configuration is that the bottom wall 104 is raised somewhat from contact with the upper sidewall 122. This raises the orifices 106 to a point where air exiting therefrom is injected more directly into the space 126 without being substantially deflected by the outer sidewall 122. This condition is maintained until the tire is almost entirely inflated.

Figure 7:
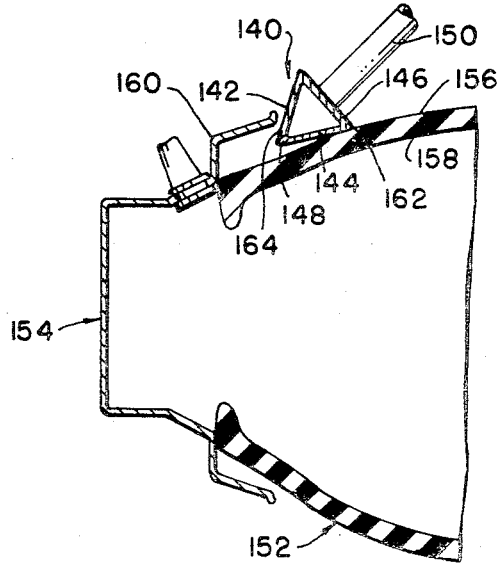
FIG. 7 is a view similar to FIG. 6 illustrating a further embodiment of the tire bead seater and illustrating the tire when it is almost completely inflated.

FIG. 7 illustrates a tire bead seater 140 having a triangular cross-sectional configuration. The bead seater 140 comprises sidewalls 142, 144, 146. Spaced apart orifices 148 are provided at the juncture of the sidewalls, 142, 144. A nozzle 150 is provided for the injection of air under pressure into the annular tubular bead seater. The bead seater 140 is utilized to inflate a tire 152 which is mounted on a wheel 154 as previously described.

The bead seater 140 has the advantage of raising the orifices 148 from the upper surface 156 of the sidewall 158 of the tire 152 to thereby direct the airstreams into the tire without deflection as previously described in connection with FIG. 6. An additional advantage of this construction, which also holds true for FIG. 6, is that as the upper surface 156 of the sidewall rises and approaches contact with the lower surface of the sidewall 144, the jets issuing from the orifices 148 come closer and closer to the upper surface 156 of the sidewall. Thus, the streams of air continue to be aimed at the space between the rim 160 and sidewall surface 156. In a configuration such as that illustrated in FIG. 2, a compromise must be made as to the direction of the jets issued from the orifices because the orifices maintain substantially the same geometric relationship with the sidewall throughout the entire inflating process.

The triangle formed by the sidewalls 142, 144, 146 is an equilateral triangle, although other triangular configurations may be used. The salient point of the configuration as illustrated is that the apex 162 defined by the juncture of the walls 144, 146 is at about the same horizontal level or slightly above the apex 164 defined by the juncture of the sidewalls 142, 144. With this configuration, contact of the apex 162 with the sidewall 158 will result in the apex 164 being raised above the surface 156 because of the downward slant of the sidewall but will permit the sidewall to move closer to the apex 164 as the tire is inflated.

Figure 8:
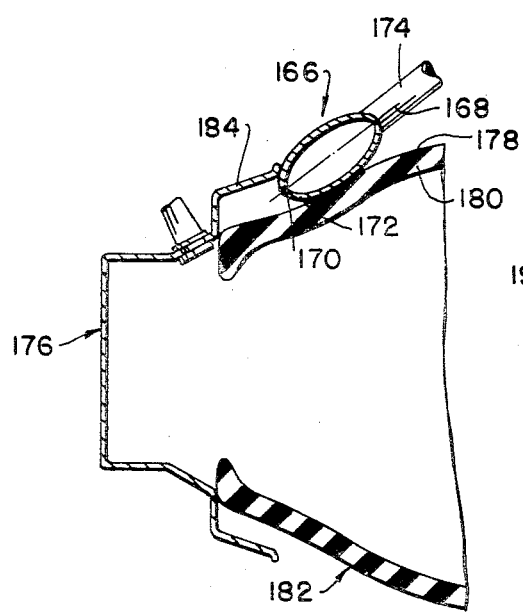
FIG. 8 is a view similar to FIG. 6 illustrating another embodiment of the tire bead seater and showing the tire when it is almost completely inflated.

FIG. 8 illustrates another embodiment of a tire bead seater 166. In FIG. 8, the bead seater 166 has an oval cross section. The oval has a longitudinal axis illustrated by the line 168 which is at about a 45° angle with respect to the horizontal plane. A plurality of spaced apart orifices 170 are provided on the inner periphery of the annular tubular member at substantially the point where the axis 168 intersects the small diameter portion 172. A nozzle 174 is provided for the injection of air into the bead seater 166 as previously described.

The bead seater 166 is received over a wheel 176 and rests on the upper surface 178 of the upper sidewall 180 of the tire 182. As in the case of the FIGS. 6 and 7 embodiments, when the tire is completely deflated as in FIG. 6, the orifices 170 are raised from the upper surface 178 of the sidewall 180 as a result of the geometry of the bead seater. As the tire 182 is inflated, the sidewall 180 will rise and the upper surface 178 will approach the orifices 170 as illustrated. However, the orifices 170 will always be close enough to the upper surface 178 so that the jets of air will be directed into the space between the sidewall 180 and wheel rim 184.

Figure 9:
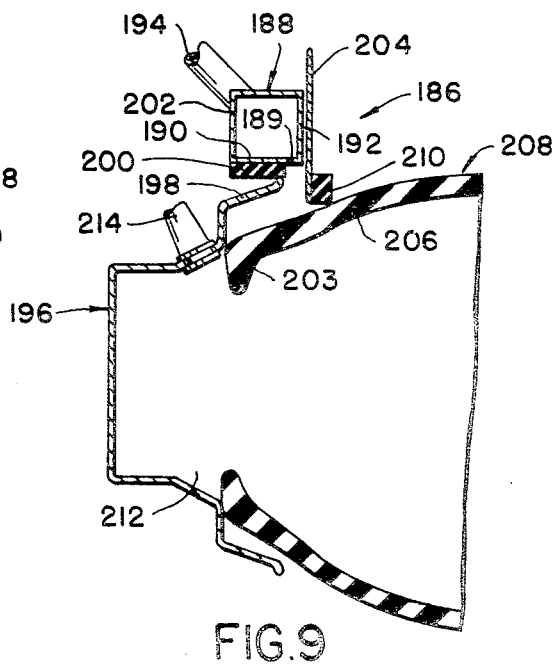
FIG. 9 is a view similar to FIG. 6 illustrating another embodiment of the tire bead seater.

FIG. 9 illustrates a further embodiment of a tire bead seater 186. The bead seater 186 comprises an annular tubular member 188 which is square in cross section. A plurality of spaced apart orifices 189 are provided in the lower wall 190 adjacent to the outer sidewall 192. A nozzle 194 is provided for the injection of air into the tubular member 188 as previously described.

The tubular member 188 is received on a wheel 196 and rests on the upper edge of the wheel rim 198. It will be noted that the outer diameter of the tubular member 188 is greater than the diameter of the wheel rim 198 so that the orifices 189 are spaced radially outwardly of the rim 198. An annular sealing member 200 is provided on the lower surface of the lower wall 190. The sealing member 200 extends radially outwardly from the inner sidewall 202 and terminates short of the orifices 189. Illustratively, the diameter of the rim 198 is such that the rim abuts against the outermost portion of the sealing member 200. The device may be utilized on a wheel having a smaller diameter, the range of adjustment being equal to the width of the sealing member 200.

An annular substantially rigid band 204, which is of slightly greater diameter than the tubular member 188, is received over the tubular member 188 with the lower portions thereof sealingly contacting the sidewall 206 of tire 208. It will be noted that a small space is provided between the band 204 and the outer sidewall 192 of the tubular member 188. This permits the band 204 to rise as the tire is inflated without causing displacement of sidewall member 188. An annular ring 210 of resilient material is provided on the outer surface of the band 204 adjacent to the bottom edge thereof. The sealing ring 210 provides the desired sealing contact with the sidewall 206 of the tire.

Inflation of the tire 208 with the bead seating apparatus 186 is substantially similar to the use of the apparatus illustrated in FIG. 6. Initially, the sidewall 206 of the tire is in a downwardly inclined position as shown in FIG. 6. As the tire is inflated by injection of air through the nozzle 194, with consequent jets of air exiting from the orifices 189 into the space between the band 204, sidewall 206 and rim 198 into the chamber 212, the side wall 206 rises carrying with it the band 204. The combination of the tubular member 188 and band 204 maintains a substantially airtight seal between the wheel 196 and sidewall 206, the small space between the tubular member 188 and band 204 not substantially affecting the seal. When the sidewall 206 has risen sufficiently to raise the bead 203 to a position almost forming a seal with the rim 198 as shown in FIG. 9, the tire is further and completely inflated by injecting air under pressure through the conventional nozzle 214.

As will be appreciated, the bead seating apparatus 186 has substantially all of the advantages associated with the apparatus described in connection with FIG. 6.

I claim:

1. Apparatus for inflating tubeless tires on a vehicle wheel comprising an annular tube of larger diameter than the wheel to be received over the wheel adjacent to the rim thereof, orifice means around the inner periphery of the tube for injecting a substantially continuous ring of air under pressure through the space between the wheel rim and the bead of a noninflated tubeless tire mounted on the wheel, and inlet means on the tube for supplying air under pressure to the interior of the tube.

2. Apparatus as defined in claim 1 and further characterized in that the orifice means is aimed at an angle of substantially 45° with respect to a plane parallel to the sidewall of the wheel and tire.

3. Apparatus as defined in claim 1 and further characterized in that the orifice means comprises a plurality of openings spaced around the inner periphery of the tube.

4. Apparatus as defined in claim 1 and further characterized in that the orifice means comprises a plurality of spaced apart nozzles on the inner periphery of the tube.

5. Apparatus as defined in claim 1 and further characterized in that said annular tube includes adjustment means to vary the diameter thereof.

6. Apparatus as defined in claim 5 and further characterized in that said adjustment means comprises a turnbuckle, said annular tube being discontinuous and having a pair of free opposed plugged ends, the turnbuckle extending between said ends and adapted to move said ends closer together or further apart to vary the diameter of the annular tube as desired.

7. Apparatus as defined in claim 6 and further characterized in that said orifice means includes nozzles adjacent each of said tube ends, said nozzles being aimed to direct a stream of air in the peripheral space occupied by the turnbuckle.

8. Apparatus as defined in claim 5 and further characterized in that said adjustment means includes a discontinuity in the annular tube defining a pair of adjacent free tube ends, one of said tube ends being received in the other of said tube ends in telescopic fashion whereby the annular tube may be enlarged or reduced in diameter by telescoping the ends apart or together.

9. Apparatus as defined in claim 8, and further characterized in that one of said ends includes an elongated plug telescopically received in the other of said ends and slidable therein to result in said telescopic action, said plug forming an air tight seal with said other end.

10. Apparatus as defined in claim 1, and further characterized in the provision of an auxiliary apparatus for inflating tubeless tires comprising an annular substantially rigid band of greater diameter than the diameter of the wheel to be received over the wheel adjacent the rim thereof, a layer of compressible material on the inner surface of the band to form a sliding, airtight seal with the wheel rim, an edge portion of said layer projecting beyond the edge of the band for sealing engagement with the sidewall of a tire mounted on the wheel.

11. Apparatus as defined in claim 1, and further characterized in that said annular tube is circular in cross section.

12. Apparatus as defined in claim 1, and further characterized in that said annular tube is substantially rectangular in cross section, said orifice means being provided at substantially the apex of the inner sidewall and bottom wall of the tube.

13. Apparatus for inflating tubeless tires as defined in claim 1, and further characterized in that said annular tube has a triangular cross section, one wall of said triangular cross section forming a bottom wall which is in substantially a horizontal plane when the apparatus is received over a wheel which is oriented in the horizontal plane, said orifice means being located at substantially the apex of the bottom wall and the inner sidewall of the tube.

14. Apparatus as defined in claim 13, and further characterized in that said bottom wall slants slightly downwardly towards the inner wall thereof.

15. Apparatus for inflating tubeless tires as defined in claim 1, and further characterized in that said annular tube has a substantially oval cross section, the longitudinal axis of said oval slanting upwardly from the inner diameter thereof to the outer diameter thereof with the apparatus oriented in a horizontal plane, said orifice means being provided substantially at the lowermost portion of the inner periphery of the tube.

16. The method of inflating a tubeless tire on a vehicle wheel comprising the steps of mounting a noninflated tubeless tire on a vehicle wheel, injecting air under pressure as a substantially continuous ring into the tire peripherally around the tire through the space between the wheel rim and the adjacent tire bead to partially inflate the tire and cause the tire bead to almost make sealing contact with the wheel rim, and then completely inflating the tire by injecting air under pressure through the conventional tire valve.

17. The method as defined in claim 16, and further characterized in that injection of air under pressure into the tire peripherally around the tire through the space between the wheel rim and the adjacent tire bead is discontinued substantially simultaneously with injection of air under pressure through the conventional tire valve.

18. The method as defined in claim 17, and further characterized in that the step of claim 17 is automatically accomplished by means of a valve device.

19. The method as defined in claim 16, and further characterized in the step of providing a reservoir of air under pressure as a source for the initial peripheral injection of air into the tire.

20. The method as defined in claim 16, and further characterized in the step of sealing the space between the wheel rim and the adjacent tire bead for the major portion of the time necessary to partially inflate the tire.

21. Apparatus for inflating tubeless tires on a vehicle wheel comprising an annular tube of larger overall diameter than the wheel to be received on the wheel, orifice means around the periphery of the tube and spaced radially outwardly from the periphery of the wheel for injecting air under pressure as a substantially continuous ring through the space between the wheel rim and the bead of a noninflated tubeless tire mounted on the wheel, and inlet means on the tube for supplying air under pressure to the interior of the tube.

22. Apparatus as defined in claim 21, and further characterized in that the inner diameter of said annular tube is of larger diameter than the wheel to be received over the wheel adjacent to the rim thereof, said orifice means being provided around the inner periphery of the tube for injecting air under pressure through the space between the wheel rim and the bead of a noninflated tubeless tire mounted on the wheel.

23. Apparatus as defined in claim 21, and further characterized in that the outer diameter of the annular tube is greater than the diameter of the wheel rim while the inner diameter of the annular tube is less than the diameter of the wheel rim whereby the annular tube is received on the wheel and rests on the rim thereof, said orifice means being provided adjacent the outer periphery of the tube for injecting air under pressure through the space between the wheel rim and the bead of a noninflated tubeless tire mounted on the wheel.

24. Apparatus as defined in claim 23, and further characterized in the provision of an auxiliary apparatus for inflating tubeless tires comprising an annular substantially rigid band of greater diameter than the outer diameter of the annular tube to be received over the annular tube in sealing engagement with the sidewall of a tire mounted on the wheel for further sealing the space between the wheel rim and adjacent tire bead.

25. Apparatus as defined in claim 24, and further characterized in that said rigid band is spaced a slight distance from the outer surface of the annular tube to prevent sliding contact therebetween during inflation of a tire.

26. Apparatus as defined in claim 23, and further characterized in the provision of an annular sealing element on the lower surface of the annular tube for sealing engagement with the rim of a wheel.

27. Apparatus as defined in claim 24, and further characterized in the provision of an annular sealing element on the lower edge of the rigid band for sealing engagement with the sidewall of a tire.

Disclaimer

3,552,469.—*Lee M. Corless*, Grosse Pointe Woods, Mich. TIRE BEAD SEATER. Patent dated Jan. 5, 1971. Disclaimer filed June 16, 1971, by the assignee, *Bruce Caulkins, Inc.*

Hereby enters this disclaimer to claims 10, 20, 24, 25 and 27 of said patent.

[*Official Gazette September 14, 1971.*]